United States Patent Office 3,511,733
Patented May 12, 1970

3,511,733
NITROGENOUS POLYMERS AND PROCESS OF LAMINATING THEREWITH
John K. Fincke, Spring Valley, and Ralph E. De Brunner, Kettering, Ohio, assignors to Monsanto Research Corporation, St. Louis, Mo., a corporation of Delaware
No Drawing. Filed July 19, 1966, Ser. No. 581,667
Int. Cl. B29c 3/00; C08g 20/32
U.S. Cl. 156—243
12 Claims

ABSTRACT OF THE DISCLOSURE

A heat-reactive liquid composition obtained by mixing together (a) a bis(hydroxyalkyl) ester of an aromatic tetracarboxylic acid, (b) an inert organic solvent for the ester, and (c) an aromatic diamine. The process of making a laminate structure with such a composition by impregnating fibrous sheets, stacking said impregnated sheets, and curing at up to 500° C. under pressure.

This invention relates to nitrogenous polymers and more particularly to methods of preparing polyimide type resins and the products obtained thereby.

According to the invention, there are provided new and valuable heat-reactive liquid mixtures or varnishes which upon heating are readily converted to polyamide/carboxylates and to polyimides, depending upon the extent of heating. The varnishes, which may be used as impregnating agents or binding agents in composite fabrication, as adhesives, or as starting materials for compression moldable powders, are obtained by simply mixing an aromatic diamine with a bis(hydroxyalkyl) ester of an aromatic tetracarboxylic acid in the presence of an inert solvent or diluent.

Polyimide resins are generally well-known in the art. See, e.g., British Pats. 980,274 (1965), 942,025 (1963) and 903,271-2 (1962) and U.S. Pats. 3,190,856 and 3,220,882. They are usually prepared by reaction of an aromatic tetracarboxylic acid dianhydride with an organic diamine to obtain an intermediate, curable prepolymer wherein there are present amide linkages from an amino group of the diamine and a carboxy group of the tetracarboxylic component, with two carboxy groups of the tetracarboxylic component being unlinked to the organic amine component. Upon heating at elevated temperatures, intramolecular cyclization occurs with reaction of the unreacted carboxylic group at the amide portion of the polymer to give an imide structure. Thus, condensation of, say, 1,2,4,5-benzenetetracarboxylic dianhydride and p-phenylenediamine to give a prepolymer amide-acid and curing of the latter to a polyimide proceeds substantially as follows:

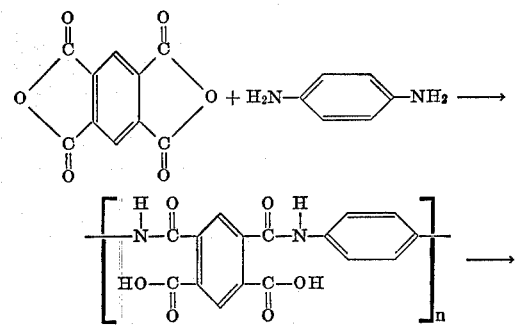

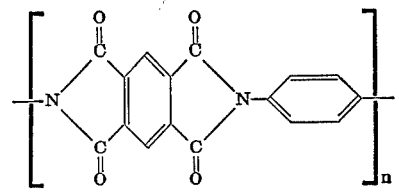

where $n$ denotes the degree of polymerization.

Because curing of the polyamide/acid gives the exceptionally stable polyimides, the prepolymers are of great potential interest for the preparation of heat- and solvent-resistant finishes and composites. In such applications, curable materials are generally most expediently employed in solution. However, the usual prior art polyamide/acids possess limited solubility; hence, in order to employ them in these fields, it has been necessary to use such uncommon, expensive solvents as N-methylpyrrolidone, dimethylformamide, dimethylacetamide, pyridine, dimethyl sulfoxide, etc. A further limitation on the wide applicability of the polyamide acids is the noxious nature of such solvents. A very significant technical disadvantage stems from the fact that in the preparation of laminates or composites, use of a difficultly soluble impregnating agent is hard on the manufacturing equipment, e.g., dipping tanks. Clean-up becomes a cumbersome, expensive operation whenever water and/or readily available solvents are ineffective for this purpose.

Another disadvantage of prior polyimide forming compositions is the frequent necessity of using high temperatures and pressures, e.g., temperatures of 600° F. to 700° F. in the press cycle in order to obtain conversion to the polyimide. The higher the temperatures at which fusion of the polyamide/acid permitted molding, the more vigorous was the escape of by-product water and/or alkanol and hence the more tendency to form weakening bubbles in the laminate structure.

Also, although the polyimides obtained from prior art polyamide/acids or polyamide/carboxylates possess very good thermal properties, the mechanical properties, while not inferior, could well be improved.

Accordingly, an object of this invention is the provision of improved starting materials for the preparation of polyimide resins. Another object is the provision of improved impregnating solutions or varnishes for use in laminate fabrication. An important objective is the provision of improved polyimide resins.

These and other objects hereinafter disclosed are provided by the invention wherein there is provided a heat-reactive liquid mixture by mixing together (I) an ester of the formula

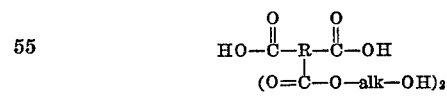

wherein R is a tetravalent aromatic radical of from 6 to 24 carbon atoms, is free of olefinic and acetylenic unsaturation and of substituents which react with the amine radical in preference to a radical containing the

linkage, and wherein one pair of the radicals

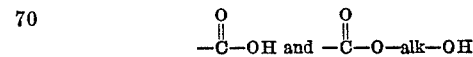

is positioned at a first pair of non-tertiary nuclear carbon atoms which are immediately consecutive and wherein the other pair of the radicals

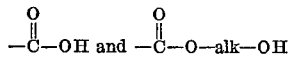

is positioned at a second pair of non-tertiary nuclear carbon atoms which are immediately consecutive, said second pair being separated from said first pair by at least one carbon atom, and alk denotes an alkylene radical having from 2 to 4 carbon atoms in the chain and a total of from 2 to 8 carbon atoms; (II) an inert organic liquid solvent for the ester, and (III) a diamine of the formula H$_2$N—Z—NH$_2$ wherein Z is an aromatic radical having from 6 to 18 carbon atoms and being free of olefinic and acetylenic unsaturation and of substituents which react with the carboxy radical more readily than does the amine radical.

Drying and heating of the varnish up to a temperature of, say, about 150° C., causes a condensation reaction to give a polyamide having hydroxyalkylated carboxy groups, thus:

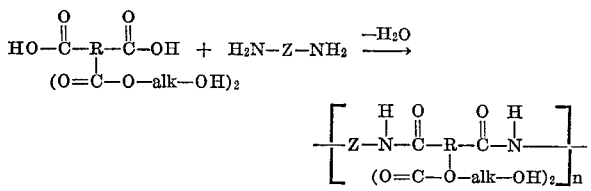

wherein alk, R, and Z are as above defined, and $n$ denotes the degree of polymerization.

Continued heating, say, at up to about 500° C., and preferably at up to about 350° C., results in liberation of alkylene glycol with intramolecular cyclization to the polyimide:

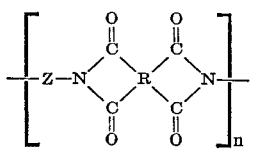

The alkylene glycol is volatilized at a steady rate during the curing; hence, bubble-formation such as that encountered with sporadically or suddenly evolved by-product is minimized. Moreover, any alkylene glycol which is retained in the cured product serves to plasticize it. Being water-soluble, the alkylene glycols are readily washed off any of the equipment.

Advantageously, the bis(hydroxyalkyl) esters which are condensed with the diamine in preparing the polyamide/carboxylates are obtained by reacting an appropriate aromatic tetracarboxylic acid or the dihydride thereof with an appropriate alkylene glycol. Even though an excess of the glycol is used, complete esterification is not obtained without using extremely stringent esterifying conditions, e.g., operating in the presence of a large quantity of a dehydrating agent. The glycol is a convenient solvent for the esterification and for the polyamide-forming reaction.

The invention thus also provides a simple and convenient means of preparing polyamide (and subsequently polyimide) structures, which method comprises (1) contacting a tetracarboxy compound of the formula:

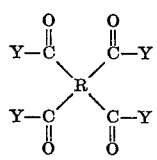

wherein each Y denotes —OH when taken singly and stand for —O— when two Y's are taken together and R is as above defined with an alkylene glycol of the formula HO—alk—OH wherein alk is as above defined, to obtain a solution, in said glycol, of the diester

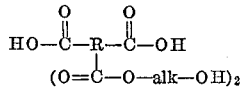

(2) contacting said solution with the diamine

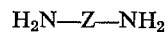

wherein Z is as above defined, to obtain a varnish, (3) applying the varnish to a substrate and drying and heating at up to about 150° C. to obtain deposited upon the substrate the polyamide/carboxylate

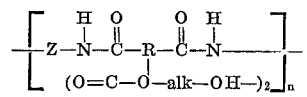

As hereinbefore disclosed, heating at higher temperatures gives the polyimide. The bis(hydroxyalkyl) tetracarboxylates may also be prepared by metathesis or cross-esterification, e.g., by reaction of a lower tetraalkyl tetracarboxylate with the alkylene glycol. When the alkyl esters of the tetracarboxylic acids are reacted with the alkylene glycols to give the hydroxyalkyl esters, alkanols are the by-products. Although the alkanols are generally poor solvents for the polyamide/acids obtained by reaction of tetracarboxylic acids or their dianhydrides with diamines, they are good solvents for the present varnishes. Accordingly, the presence of by-product alkanols is immaterial.

Examples of bis(hydroxyalkyl) esters which are useful include the simple and mixed esters, e.g., the bis(3-hydroxypropyl), the bis(4-hydroxybutyl), the bis(2-hydroxy-1-methylethyl), the bis(2-hydroxypropyl), the bis (2,3-dimethyl-4-hydroxybutyl), the 2-hydroxyethyl 4-hydroxybutyl, and the bis(2-ethyl-2-methyl-3-hydroxypropyl) esters of the aromatic tetracarboxylic acids, generally, so long as such acids are free of non-benzenoid unsaturation and of substituents which react with an amine radical more readily than does the carboxy group and so long as the carboxy and carboxylate radicals are positioned as described above; such as 1,2,4,5-benzenetetracarboxylic acid; 1,4,5,8-naphthalenetetracarboxylic acid; 4-nitro-1,2,5,6-naphthalenetetracarboxylic acid; 3,3',4,4'-biphenyltetracarboxylic acid; 2,2'-dimethoxy-3,3',4,4'-biphenyltetracarboxylic acid; 2,2',3,3'-biphenyltetracarboxylic acid; 3,6-dimethoxy-1,2,4,5-benzenetetracarboxylic acid; 2,2',5,5'-tetramethyl-3,3',4,4'-biphenyltetracarboxylic acid; 3,4,9,10-perylenetetracarboxylic acid; 4,4'-isopropylidenediphthalic acid; 1,8,9,10-phenanthrenetetracarboxylic acid; 4,4'-carbonyldiphthalic acid; 4,4'-[2,2,2-trifluoro-1-(trifluoromethyl)ethylidene]diphthalic acid; 4,4'-oxydiphthalic acid; 4,4'-sulfonyldiphthalic acid; 2,2'-dichloro-3,3',4,4'-biphenyltetracarboxylic acid; etc. Presently preferred are the bis(hydroxyalkyl) esters of 4,4'-carbonyldiphthalic acid; i.e., compounds of the structure

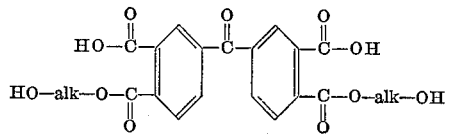

wherein alk is an alkylene radical having from 2 to 4 carbon atoms in the alkylene chain and a total of 2 to 6 carbon atoms.

An ester of two or more different glycols and the aromatic tetracarboxylic acid may be used, e.g., there may be employed mixed esters obtained by esterifying one of the four carboxylic groups with one alkylene glycol and then esterifying another carboxylic group with a different glycol.

The diamine with which the bis(hydroxyethyl) tetracarboxylate is reacted may be any aromatic diamine which has from 6 to 18 carbon atoms and which is free of non-benzenoid unsaturation and of substituents which react with the carboxy radical more readily than does the amine radical, e.g., 4,4'-oxydianiline, o-, m- or p-phenylenediamine, benzidine, 3,3'-dimethoxybenzidine, 1,4-, 5,8- or 1,8-naphthalenediamine, 4,4'-sulfonyloxydianiline, 4,4'-methylenedianiline, 4,4' - methylenebis(3 - nitroaniline), 4,4' - ethylidenedianiline, 2,3,5,6-tetramethyl-p-phenylenediamine, 4,4'-oxybis(2,2'-propylaniline), etc.

Two or more different diamines or two or more different bis(hydroxyalkyl) tetracarboxylates may be used as the respective amine and carboxylic reactants; e.g., a mixture of an amine such as benzidine and 4,4'-oxydianiline or p - phenylenediamine and 1,8 - naphthalenediamine may be reacted with a single carboxylic component such as bis(2-hydroxyethyl) 1,2,4,5-benzenetetracarboxylate or bis(3-hydroxypropyl) 4,4'-carbonyldiphthalate or with a mixture of carboxylates such as a mixture of bis(3-hydroxybutyl) 4,4'-isopropylidenediphthalate and bis(2-hydroxyethyl) 3,4,9,10 - perylenetetracarboxylate or a mixture of bis(2 - hydroxyethyl) 4,4'-carbonyldiphthalate and bis(2,3-dimethyl-4-hydroxybutyl) 4,4'-carbonyldiphthalate. Thereby there are obtained polymers having different linkages dispersed more or less randomly in the polymer molecule. Such an expedient is useful in tailoring polymer structures having properties intermediate to those attributanble to the individual linkages.

Because condensation of the bis(hydroxyalkyl) ester of a tetracarboxylic acid with the diamine occurs by reaction of the two free acid groups of the ester with the two amino groups of the diamine to form the polyamide/carboxylate, the ester and the amine are advantageously employed in such stoichiometric proportions, i.e., one mole of the ester per mole of the amine. However, a slight excess of either component may be used.

The presently provided impregnating solution is prepared by simply contacting the diester with the diamine in an inert, organic liquid medium which is a solvent for the ester. However, for facilitating subsequent processing, it is preferred to employ a medium in which solution of both the ester and the diamine can be attained. If an excess of the alkylene glycol has been employed in esterifying the tetracarboxylic dianhydride, the excess can conveniently serve as solvent in the varnish. Also, if desired, to any excess of alkylene glycol present in the esterification product there may be added one or more other solvents, e.g., a lower alcohol or ether such as butanol or propyl ether. When production of the bis(hydroxyalkyl) ester has been conducted by transesterification, e.g., by reaction of an alkylene glycol with another diester of the tetracarboxylic acid, there is obtained as by-product a hydroxy compound corresponding to the alcoholic moiety of the starting ester, e.g., a lower alkanol when the starting ester is a dialkyl tetracrabroxylate. The by-product hydroxy compound need not be removed from the crude esterification product previous to formulation of the varnish. For example, a dialkyl ester such as dibutyl 4,4'-carbonyldiphthalate is reacted with ethylene glycol to give bis(2-hydroxyethyl) 4,4'-carbonyldiphthalate together with butanol as by-product. Without removing the butanol, the reaction mixture is contacted with a diamine for obtaining the impregnating varnish. The butanol serves as solvent for both the bis(2-hydroxyethyl) ester and for the carboxylate-containing polymer. If dilution of either the polymer-forming reaction mixture or of the polymer containing product is desired, there may be employed either ethylene glycol or butanol or any other lower alkylene glycol, alcohol or ether. In the transesterification reaction as well as in esterification of the free tetracarboxylic acid or dianhydride thereof, an excess of ethylene glycol is conveniently used to provide for proper esterification, for serving as solvent in the polymer-forming reaction, and in subsequent application of the polymer to substrate for conversion to polyimide.

Depending upon the quantity of solvent used, the reaction mixture comprising the diester and the solvent (which advantageously is the same as that used for preparing the bis(hydroxyalkyl ester)) may be used directly as a coating or impregnating agent. However, if the esterification reaction mixture is too fluid for the intended application, some of the solvent may be removed partially or even entirely by volatilization at ordinary pressure or by evacuation. Either the fluid concentrate obtained by removing only part of the solvent, or the solvent-free residue may be used for the preparation of laminates or other composites. The impregnated or coated substrate is then heated for conversion to the prepolymer, i.e., the polyamide/carboxylate.

Curing of the polyamide/carboxylate for conversion to polyimide is conducted by heating either in air or in an inert atmosphere which may be, e.g., nitrogen, argon, or vacuum. Temperatures of from, say, 150° C. to 350° C. are preferred.

In a coating application, a suspension or solution of the polyamide/carboxylate, with or without pigments such as titania, zinc oxide, silica, alumina, iron oxide, etc. is preferably deposited upon the substrate and the diluent or solvent is evaporated from the substrate. Curing is then conducted by heating the substrate, with its deposit of dried coating, preferably at a temperature of from about 150° C. to up to about 350° C. The curing temperature will depend upon such conditions, as time, pressure and atmosphere, as well as upon the nature of the substrate. Generally, a lower temperature will require longer curing time. In experimental runs, the coated substrate will be maintained at the maximum temperature permitted by the substrate for a time of about a few minutes to several hours in order to assure completion of curing. This point can be readily ascertained in experimental runs by noting substantial cessation in weight change owing to volatilization of the by-product alkylene glycol resulting from the ring-closing imide-forming reaction between the carboxylate moiety and the unreacted amino radical of the carboxylate-containing polymer. The well cured film will be smooth, tenaciously adherent and tough.

For the preparation of laminates, the impregnating varnish is used to coat and/or impregnate plies of substantially any desired material of construction, and the thus-treated plies are subjected to heat, with or without concomitant use of pressure. When pressure is employed, it generally need be only of a low order, e.g., pressures of from, say, about 10 to 200 p.s.i. may be used. Plies of glass, metal, plastics and ceramics are thus tenaciously bonded together. Other composites may be similarly prepared, employing filaments or textiles of glass, metal, silica, graphite, etc. Finely comminuted reinforcing materials or fillers, which may be in Microballoon form, may be incorporated with the carboxylate-containing polymer and solvent to form a mobile mass which can be formed while curing or such fillers may be used with the carboxylate-containing polymers when they are employed as coatings, impregnating agents or adhesives.

The presently provided polyamide/carboxylates possess utility per se in plastics and coating applications, i.e., they need not be converted to the polyimides, because solutions thereof are useful as protective finishes when exposure to polyimide-forming temperatures is not contemplated. However, since the carboxylate-free, cured products, i.e., the polyimides, may be heated to about 350° C. in air and higher in an inert atmosphere without substantial weight loss and because the cured products resist attack by liquids which dissolve or soften the polyamide/carboxylate from which they are obtained, conversion to the polyimides forms the major usefulness of the polyamide/carboxylates.

Whether or not the contemplated utility involves the polyamide/carboxylate or a polyimide as the end product, a very convenient method of operation involves preparing a bis(hydroxyalkyl) ester of the aromatic tetracarboxylic acid by reacting the acid, or preferably its dianhydride with an alkylene glycol using an excess of the glycol as a solvent to obtain a solution of said ester in the glycol, mixing the solution with the appropriate diamine, and using the resulting mixture or varnish for application to a substrate, as an impregnating agent in the manufacture of laminates or other composites, or for casting into a film. Conversion to the polyamide/carboxylate is effected in situ. For example, for the preparation of a composite, plies of an inorganic textile, say, of glass cloth or of a textile of silica, carbon or fiber are impregnated with the varnish and heated under pressure. Depending upon the extent of heating, the matrix of the resulting composite will consist essentially of either the polyamide/carboxylate or the polyimide to which it cyclizes upon continued heating at higher temperatures. Advantageously the varnish is applied to the substrate and polymerization to the polyamide/carboxylate is conducted by heating the substrate with its deposit to about 150° C. before stacking to a laminate structure. The stack is then compression molded at a temperature of above 150° C. and below about 500° C. at a pressure of, say, from about 10 p.s.i. to 1,000 p.s.i. to obtain a polyimide-containing laminate.

The invention is further illustrated by, but not limited to, the following examples.

EXAMPLE 1

A solution of 322.2 g. (1.0 mole) of 4,4'-carbonyldiphthalic anhydride in 510.2 g. (ca. 8.2 moles) of ethylene glycol was slowly warmed to 130° C. The resulting reaction mixture, comprising the bis(2-hydroxyethyl) ester of 4,4'-carbonyldiphthalic acid dissolved in ethylene glycol, was allowed to cool to 40° C. It was then mixed with 108.1 g. (1.0 mole) of m-phenylenediamine, and the whole was stirred for 30 minutes without application of heat. The resulting mixture, having a solids content of 60%, will be hereinafter referred to as a varnish.

It was employed as follows in laminate fabrication: "B"-staged, impregnated stock was prepared by dipping panels of commercial glass fiber textile into the varnish, draining them and then maintaining them on racks in a forced draft air oven at 120° C. (248° F.) for 90 minutes. During this heating, or curing, the bis(2-hydroxyethyl) ester reacted with the diamine to give the polyamide/carboxylate.

Various glass fiber textiles were "B"-staged as described above to give stock which was used as follows in laminate preparation. Indication of the suitability of each stock was obtained by subjecting a sample of the stock to heating at 225° C. for 10 minutes and then determining the percent volatiles and the resin content of the stock by the difference in the stock before and after the 225° C. heat-treatment.

Thus, employing a stock which had been obtained by "B"-staging an S–994 glass, 181 style, HTS finish cloth and having resin content of 38.8% and a volatiles content of 6.5%, there was laid up a 12-ply laminate of 4" squares of the stock. After weighing the varnish-impregnated assembly, it was pressed for 3 hours at 244° C. and 25 p.s.i., and then reweighed. The difference between the original weight and that of the pressed product represents flow-out of the varnish. A 6.5% flow was thus determined. The quantity of resin in the pressed laminate was determined by subtracting the total weight of the bare textile from the weight of the laminate after pressing. A resin content of 35.3%, based on the weight of the pressed laminate, was thus determined. The smooth, substantially translucent pressed laminate, having a matrix of the polyimide resin, had a thickness of from 0.127" to 0.130" and a Barcol hardness of from 58 to 60, a flexural strength of 67,300 p.s.i. and a flexural modulus of 2,900,000 p.s.i. (3 flexural specimens).

Post-curing of the laminate was conducted by heating for 2-hour periods at each of the following temperatures: 200, 225, 250, 300, 325 and 350° C. and for 4 hours at 372° C. The post-cure increased the average values on triplicate determinations to a flexural strength of 71,000 p.s.i. and a flexural modulus of 3,000,000 p.s.i.

In subsequent laminate preparations employing the same varnish and the same grade of cloth but "B"-staging to a 40.5% resin content and to 6.3% volatiles, and curing the 12-ply, 4" square laminate for 40 minutes at 260° C. and 50 p.s.i., there was obtained after the same post-curing treatment a flexural strength of 68,000 p.s.i. and a flexural modulus of 3,100,000 p.s.i. as averages of triplicate runs.

Another batch of the varnish, prepared as described above and likewise having a solids content of 60% was employed to "B"-stage the same grade of cloth to a resin content of 34.9% and a volatiles content of 5.6%. Laminate assembly (12-ply, 8" squares) of this stock was pressed as follows: 2 minutes at 260° C. and 25 p.s.i., then 3 minutes at 260° C. and 50 p.s.i., and finally 40 minutes at 260° C. and 100 p.s.i. The laminate thus obtained had a flexural strength of 72,500 p.s.i. and a modulus of 2,700,000 p.s.i. (average of 5 specimens). Heating the laminate at 316° C. for 100 hours reduced the flexural strength to 24,000 p.s.i. and the modulus to 1,900,000 p.s.i. Boiling in water for 2 hours reduced the flexural strength to 58,000 p.s.i. but had no effect on the modulus; i.e., after the boiling test, the modulus was still 2,700,000 p.s.i. (average of 3 specimens).

In still another laminate preparation, a similarly prepared 60%-solids varnish was employed as the impregnating agent for the preparation of a "B"-staged stock having a resin content of 36.0% and a volatiles content of 5.2% from glass fiber textile S–994, 181 style, A–1100 finish. Curing of a 12-ply, 8" square laminate prepared from this stock was conducted for 5 minutes at 260° C. and 50 p.s.i., and then 40 minutes at 260° C. and 100 p.s.i. The laminate thus prepared had an average thickness of 0.120 to 0.125", a flexural strength of about 83,800 p.s.i. and a flexural modulus of about 3,300,000 p.s.i.

The same varnish was also used to impregnate S–994 glass, 181 style, F–12 (heat-cleaned). It yielded a "B"-staged stock having a resin content of 27.3% and a volatiles content of 4.9%. Curing of a 12-ply, 8" square laminate of the stock for 5 minutes at 260° C. and 50 p.s.i. and then for 40 minutes at 260° C. and 100 p.s.i. resulted in an average flexural strength of 72,600 p.s.i. and an average flexural modulus of 3,300,000 p.s.i. These data show that although the strength characteristics of the laminates vary somewhat with the pressing conditions and the nature of the finish on commercially obtained glass fiber textile, the presently provided varnish gives extremely high-strength products when employed as the impregnating agent for glass cloth laminates.

EXAMPLE 2

The varnish of Example 1 was evaluated as a metal to metal adhesive as follows: The varnish was thoroughly mixed with an equal weight of aluminum powder (filler grade), and a single coat of the resulting mixture was applied to a portion of a phosphate-cleaned, 20-gauge 3" x 0.875" stainless steel panel to provide for an 0.5" lap joint with another panel of the same kind. The resulting assembly was dried for 1 hour at 380° C., placed in a press jig (pressure of up to 200 p.s.i.), and heated at 316° C. for 5 minutes at 20 p.s.i. and 70 minutes at 200 p.s.i. Evaluation of the tensile shear strength of the resulting bonded unit gave a value of 1150 p.s.i.

That the manner in which the substrate is cleaned has but little, if any, effect on the bond strength was shown by employing the varnish/aluminum powder mixture as an adhesive for the same kind of steel which had been cleaned with either dichromate or peroxide instead of phosphate. Shear strength values of 1240 p.s.i. and 1100 p.s.i. were thus obtained.

EXAMPLE 3

A mixture consisting of 358.2 g. of 4,4'-carbonyldiphthalic acid and 310 g. of ethylene glycol was gradually warmed to 115° C. The resulting reaction mixture, comprising a solution of the bis(hydroxyethyl) ester of 4,4'-carbonyldiphthalic acid, unreacted ethylene glycol and some by-product water, was allowed to cool to 40° C. and then thoroughly stirred with 108 g. of m-phenylenediamine. Immersion of panels of glass S-994, style 181, F-12 finish cloth into the resulting varnish followed by oven-heating in air at 120° C. for 90 minutes gave "B"-staged stock comprising the polyamide/carboxylate and having a resin content of 41.3% and a volatiles content of 7.5%, as determined by heating a sample of it for 10 minutes at 225° C. and noting the difference in weight before and after heating. The weight loss represents volatilized ethylene glycol owing to cyclization to the polyimide.

When "B"-staged impregnated stock was used for preparation of a 14-ply laminate of 4" squares, and pressing was conducted for 5 minutes at 260° C. and 40 p.s.i., followed by 55 minutes at 260° C. and 100 p.s.i. there was obtained a smooth and translucent, tough laminate having a resin content of 32.3%. Three flexural specimens of the laminate were post-cured by heating them for 2 hours at each of the temperatures 200°, 225°, 250°, 300°, 325° and 350° C. and finally for 4 hours at 372° C. The average flexural strength of the thus-treated specimens was determined to be about 50,700 p.s.i. and the average flexural modulus 2,500,000 p.s.i.

EXAMPLE 4

A mixture consisting of 294.2 g. (1.33 moles) of 1,2,4,5-benzenetetracarboxylic 1,2,4,5-dianhydride and 466 g. (7+ moles) of ethylene glycol was heated with stirring at 100° C. for one hour. The resulting reaction mixture, consisting of a solution of the bis(2-hydroxyethyl) ester of the benzenetetracarboxylic acid in ethylene glycol, was allowed to cool to 40° C. and there was then added to it 162.2 g. (1.5 mole) of m-phenylenediamine. The temperature rose to 53° C., thus indicating at least some condensation of the amine with the ester. Stirring was continued until all of the diamine had dissolved. The resulting mixture, a clear, light-colored solution (solids content of 60%), was converted to the hard, solid polyimide upon heating it at 220° C.

EXAMPLE 5

A mixture consisting of 32.2 g. (0.10 mole) of 4,4'-carbonyldiphthalic anhydride and 49.3 g. (0.79 mole) of ethylene glycol was charged to a flask equipped with thermometer, stirrer, and condenser carrying a drying tube, and the mixture was heated with stirring to a temperature of 115° C. within a forty minute period, and maintained at that temperature for one hour. The resulting solution of the bis(2-hydroxyethyl) ester of 4,4'-carbonyldiphthalic acid was allowed to cool to room temperature and there was added to it, portionwise over a ten minute period, 10.8 g. (0.10 mole) of m-phenylenediamine. After stirring for about 20 minutes the resulting clear, light orange varnish was poured into a mold and cured by heating for 2 hour periods at each of the following temperatures: 200°, 225°, 250°, 300°, 325° and 350° C. and finally for 4 hours at 372° C. The hard article thus obtained was translucent and integral. A portion of it was sawed off and ground to a fine powder. Thermogravimetric analysis in helium of an 0.200 g. sample of the powder at a heating rate of 2.7° C./minute to 400° C. showed no loss in weight.

The varnish of this example was also converted to a molding powder and compression molded as follows: After drying it to a solid block by heating at 120° C. for 4 hours, the block was ground to a powder, the powder redried at 120° C., and molded to pellets having a diameter of 2" and a thickness of 0.375" employing a temperature of 316° C. and a pressure of 1000 p.s.i. in a 10 minute press cycle. The smooth, glossy pellets of the polyimide thus obtained were tough and well-dimensioned.

Although, for purposes of comparison, the above examples are limited to the hydroxyethyl esters as the ester and to m-phenylenediamine as the organic amine component of the polyimide-forming varnishes, other bis(hydroxyalkyl) esters and other diamines are likewise useful; thus, instead of the bis(2-hydroxyethyl) ester of the above example there may be prepared and employed the bis(3-hydroxypropyl) or the bis(3- or 4-hydroxybutyl) ester of 4,4'-carbonyldiphthalic acid or 1,2,4,5-benzenetetracarboxylic acid or of other tetracarboxylic acids, e.g., 4,4'-isopropylidenediphthalic acid or 2,3,6,7-naphthalenetetracarboxylic acid and instead of the m-phenylenediamine there may be used benzidine or 1,8-naphthalenediamine or 4,4'-oxydianiline or 4,4'-sulfonyldianiline. The solvent may or may not be the alkylene glycol from which the bis(hydroxyalkyl) ester is derived. For example, instead of employing an excess of ethylene glycol in preparing the bis(2-hydroxyethyl) ester of 4,4'-carbonyldiphthalic acid as in the above examples, the ester may be prepared by employing in the reaction mixture only the stoichiometrically required quantity of the glycol in the presence or absence of an inert organic liquid diluent. Subsequently, for the polyamide- and polyimide-forming reactions, when an excess of the glycol has not been used in forming the ester, there may be used such diluents as the lower alcohols.

Obviously, many modifications and variations of the invention may be made without departing from the spirit and scope thereof, and therefore only such limitations should be imposed as are indicated in the appended claims.

What is claimed is:

1. A heat-reactive liquid mixture obtained by mixing together (I) an ester of the formula

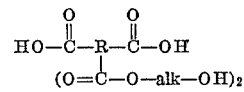

wherein R is a tetravalent aromatic radical of from 6 to 24 carbon atoms, is free of olefinic and acetylenic unsaturation and of substituents which react with the amine radical in preference to a radical containing the

linkage, and wherein one pair of the radicals

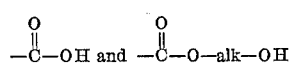

is positioned at a first pair of non-tertiary nuclear carbon atoms which are immediately consecutive and wherein the other pair of the radicals

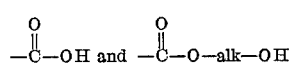

is positioned at a second pair of non-tertiary nuclear carbon atoms which are immediately consecutive, said second pair being separated from said first pair by at least one carbon atom, and alk denotes an alkylene radical having from 2 to 4 carbon atoms in the chain and a total of from 2 to 8 carbon atoms; (II) an inert organic liquid solvent for the ester, and (III) a diamine of the formula

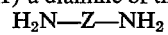

wherein Z is an aromatic radical having from 6 to 18 carbon atoms and being free of olefinic and acetylenic unsaturation and of substituents which react with the carboxy radical more readily than with the amine radical.

2. The liquid mixture defined in claim 1, further limited in that R is

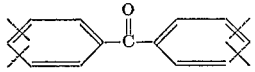

3. The liquid mixture defined in claim 1, further limited in that alk is —CH$_2$CH$_2$—.
4. The liquid mixture defined in claim 1, further limited in that Z is phenylene.
5. The liquid mixture defined in claim 1, further limited in that Z is phenylene, alk is ethylene and R is

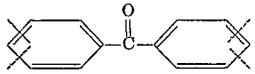

6. The liquid mixture defined in claim 1, further limited in that the solvent is ethylene glycol.
7. The method of making a laminate structure which comprises (A) impregnating plies of an inorganic textile consisting substantially of fibers selected from the group consisting of glass, metal, silica and graphite with a heat-reactive liquid mixture obtained by mixing together (I) an ester of the formula

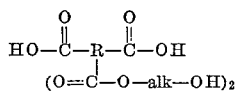

wherein R is a tetravalent aromatic radical of from 6 to 24 carbon atoms, is free of olefinic and acetylenic unsaturation and of substituents which react with the amine radical in preference to a radical containing the

linkage, and wherein one pair of the radicals

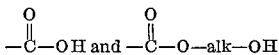

is positioned at a pair of the first non-tertiary nuclear carbon atoms which are immediately consecutive and wherein the other pair of the radicals

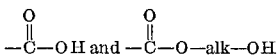

is positioned at a second pair of the first non-tertiary nuclear carbon atoms which are immediately consecutive, said second pair being separated from said first pair by at least one carbon atom, and alk denotes an alkylene radical having from 2 to 4 carbon atoms in the chain and a total of from 2 to 8 carbon atoms; (II) an inert organic liquid solvent for the ester, and (III) a diamine of the formula H$_2$N—Z—NH$_2$ wherein Z is an aromatic radical having from 6 to 18 carbon atoms and being free of olefinic and acetylenic unsaturation and of substituents which react with the carboxy radical more readily than with the amine radical, (B) heating the impregnated plies at a temperature of up to 150° C. to obtain conversion of the varnish content thereof to a polyamide/carboxylate, and (C) compression molding a stack of the plies at a temperature of up to about 500° C. to obtain a laminate comprising a polyimide matrix.

8. The method defined in claim 7, where alk is —CH$_2$CH$_2$—.
9. The method defined in claim 7, where R is

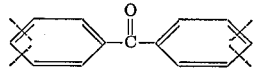

10. The method defined in claim 7, further limited in that Z is phenylene.
11. The method defined in claim 7, further limited in that alk is —CH$_2$CH$_2$—, R is

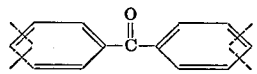

and Z is phenylene.
12. The method defined in claim 7, further limited in that the solvent is ethylene glycol.

References Cited
UNITED STATES PATENTS

| | | | |
|---|---|---|---|
| 3,326,851 | 6/1967 | Tocker | 260—47 |
| 3,037,966 | 6/1962 | Chow et al. | 260—28 |
| 2,992,960 | 7/1961 | Leeg et al. | 161—93 X |
| 3,288,842 | 11/1966 | Verdol | 260—475 |

ROBERT F. BURNETT, Primary Examiner

M. A. LITMAN, Assistant Examiner

U.S. Cl. X. R.

161—93, 156, 204; 252—188.3; 260—78